United States Patent [19]
Milton

[11] Patent Number: 5,654,825
[45] Date of Patent: *Aug. 5, 1997

[54] LINE OBSTRUCTION MARKER BALL WITH ENHANCED DAYTIME AND NIGHTTIME VISIBILITY

[76] Inventor: Richard M. Milton, 6809 Falcata Cove, Austin, Tex. 78750, by Gitta Stermer Milton, legal guardian

[*] Notice: The term of this patent shall not extend beyond the expiration date of Pat. No. 5,361,018.

[21] Appl. No.: 441,550

[22] Filed: May 15, 1995

[51] Int. Cl.⁶ .................................................. G09F 13/16
[52] U.S. Cl. .......................... 359/544; 359/515; 359/529; 359/530; 315/76; 340/983; 362/391
[58] Field of Search .......................... 362/391; 359/527, 359/528, 529, 515, 544, 530; 340/310.01, 982, 983; 315/76

[56] References Cited

U.S. PATENT DOCUMENTS

| | | | |
|---|---|---|---|
| 4,709,339 | 11/1987 | Fernandes | 340/310.01 |
| 5,361,018 | 11/1994 | Milton | 315/76 |

FOREIGN PATENT DOCUMENTS 2254826  10/1992  United Kingdom ................. 359/515

*Primary Examiner*—Robert Pascal
*Assistant Examiner*—Arnold Kinkead
*Attorney, Agent, or Firm*—Joseph F. Long

[57] ABSTRACT

An enhanced daytime and nighttime visibility marker for electrical lines is disclosed in two embodiments. Both embodiments are shaped to give visibility from all angles and to allow smooth covering with retroreflective tape. One embodiment includes a continuous burning interior light for maximum nighttime visibility.

5 Claims, 3 Drawing Sheets

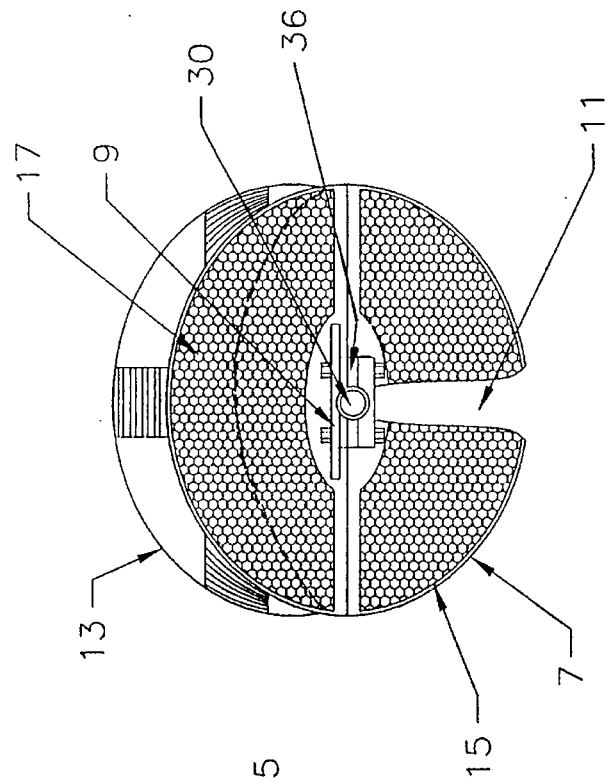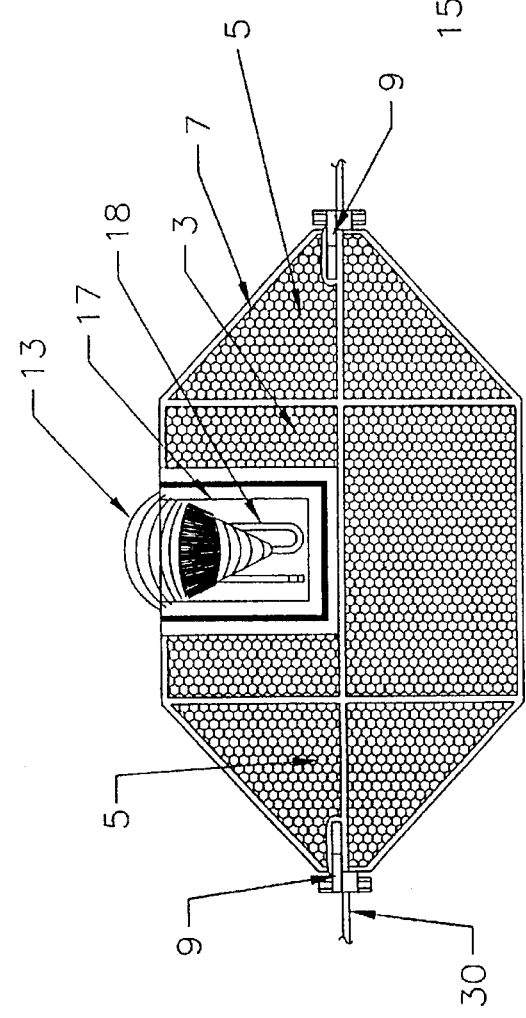

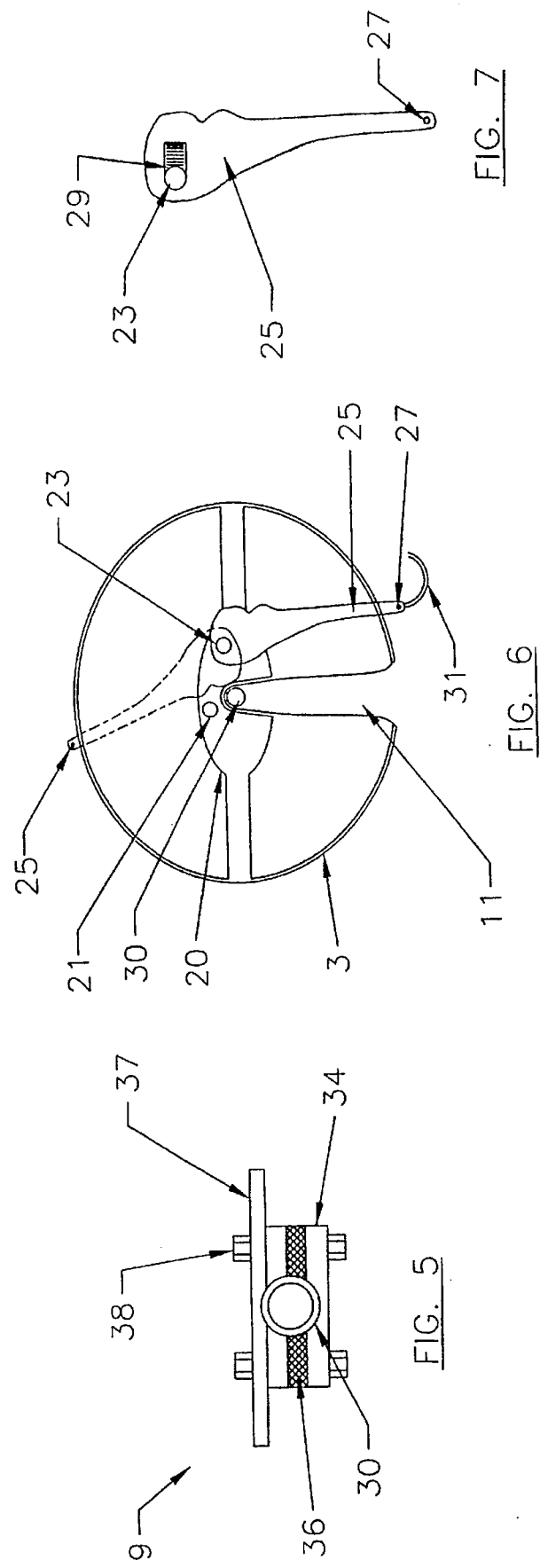

LINE OBSTRUCTION MARKER BALL WITH ENHANCED DAYTIME AND NIGHTTIME VISIBILITY

BACKGROUND OF THE INVENTION

With increasing air traffic there is an increasing need for marking electrical lines, static lines, cables etc. to be quite visible at all times under all conditions to prevent accidental damage to an airplane from line obstructions.

This invention is aimed at filling the need for a marker with enhanced conspicuity where only daytime marking is desired and for enhanced conspicuity or visibility both during the day and at night for a lighted marker ball. The closest prior art we find is U.S. Pat. No. 5,361,018, filed Aug. 9, 1993 by Milton. There are two embodiments of the present invention. In both embodiments the plastic shell is colored using U.S. FEDERAL STANDARD #12197 ORANGE in a gel coat on the outer shell of the marker. The shape in both embodiments may be described as a body with a central cylindrical segment with cone shaped segments on each end with the length of the cone shaped segments essentially the same as the length of the central segment. In an embodiment primarily for daytime use both cone shaped segments and the center segment are completely covered with fluorescent retroreflective tape. The tape may be green, yellow, yellow/green or white. In the lighted marker all of the unit except the lighted area is covered with the retroreflective tape. Both embodiments are fabricated in longitudinal halves and both units or markers have a U shaped opening to allow installation on a line from above the line. Both units are fabricated with clamps to fasten the units securely to a line. These markers differ significantly from the prior art in that both are covered with retroreflective tape and both fabricated with surfaces to allow adhesive fastening the retroreflective tape without wrinkling the tape surface. A cylindrical center portion with cone shaped ends allows tape covering or covering with a flat sheet without wrinkling. The with cone shaped ends. Shapes that would allow wrinkle free tape covering and sufficient visibility would be within the purview of the invention.

SUMMARY OF THE INVENTION

The first embodiment of the invention may be described as a marker unit shaped to give maximum visibility or light reflectance when viewed from any angle. Maximum light reflectance is achieved by smoothly covering the surface with fluorescent retroreflective tape. The assembled unit may be a central cylindrical segment with essentially equal length cone shaped segments on each end. The unit is fabricated with two longitudinal halves with a clamp base integrally formed in an upper half to fasten each end of the unit to the wire. The halves and ends are preferably adhesively fastened together. The lower half of the unit has a channel essentially as deep as the half to facilitate installation from above from a crane or helicopter.

The second embodiment of the invention is similar to the first embodiment in shape and covering and in addition is fitted with a continuous burning neon tube. In this embodiment the upper half contains a reflective channel that may extend the total length of the central section and into the cone shaped ends or that may partially encircle the center section only. A neon tube with electrodes in each end is installed in this channel and the channel is capped with a prism shaped weatherproof covering. The interior of both halves is covered with a conductive inner layer. The electrode on one end of the neon tube is connected to the conductive coating and the electrode on the other end of the neon tube is electrically connected with the support wire. With sufficient electrical field the lamp or neon tube will burn when the marker is mounted on either the static or phase line. The diameter of the neon tube, the gas pressure in the tube, the strength of the electromagnetic field, and size of the unit are interrelated parameters determining the conspicuity of the neon tube. Both embodiments of the unit may be used on lines carrying from 10,000 to 1,000,000 volts. The electricity or lines with insufficient voltage to light a neon tube. We have found that with lines carrying over 10,000 volts that a tube approximately fifty inches long and five mm. in diameter with an internal neon pressure of fifteen to twenty mm. gives good illumination.

BRIEF DESCRIPTION OF THE DRAWINGS

FIG. 3 shows a side view of the second embodiment

FIG. 4 shows an end view of the second embodiment

FIG. 5 shows an end view of a clamp that may be used in both embodiments.

FIG. 6 shows an eccentric type clamp that may be remotely pulled into a locking position to hold the marker unit securely in place on the mounting wire.

FIG. 7 shows a spring loading detail of clamp in FIG. 6.

DETAILED DESCRIPTION OF THE DRAWINGS

Figure 1:
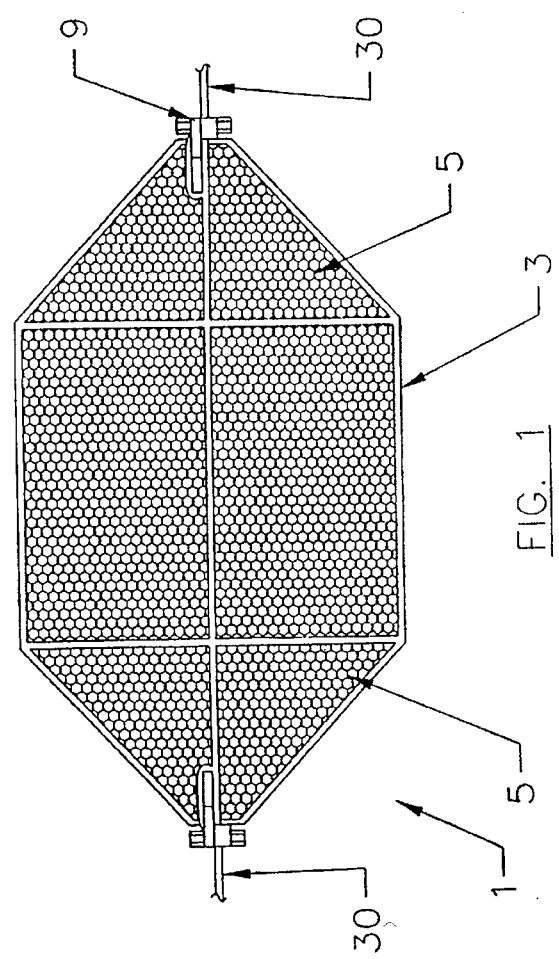
FIG. 1 shows a side view of the first embodiment

The invention may best be described from the drawings. In FIG. 1 we show a side view of unit 1 clamped to wire 30 with compression clamps 9. The compression clamps 9, shown in more detail in FIG. 5, are integrally formed in the conical shaped ends 5. The shell may be plastic, a plastic laminate structure, or fiber glass epoxy with fiber glass epoxy being preferred. A retroreflective coating may be smoothly adhesively applied over both the center section 3 and conical ends 5.

Figure 2:
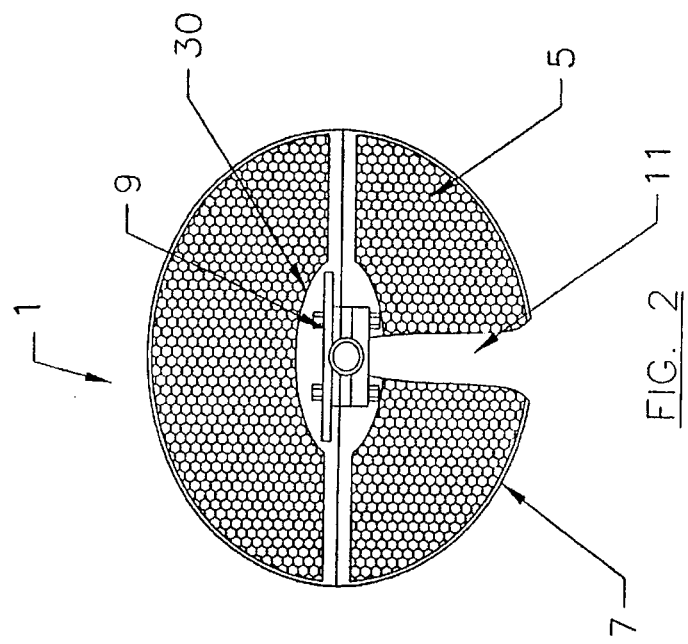
FIG. 2 shows an end view of the first embodiment

In FIG. 2 we show an end view of unit 1 indicating slot 11 to facilitate mounting the unit. The upper half of compression clamp 9 is integrally formed in the upper half of the unit. The lower half of compression clamp 9 may be removed or loosely connected to allow slipping the unit over the mounting wire. Retroreflective tape 7 covers the surface but not the slot 11.

In FIG. 3 we show a side view of a second embodiment of the unit mounted on line 30 with compression clamp 9 wherein a neon tube 18 is mounted in a reflective channel 17 which is mounted in center section 3 of the unit. The channel 17 is covered with a rainproof transparent covering 13. Both the center section 3 and conical ends 5 are covered with retroreflective tape or sheeting 7. Other shapes and locations for the light unit are feasible.

In FIG. 4 we show an end view of the second embodiment indicating the shape of the reflective neon lamp channel 17 and covering 13. Gasket 36 in compression clamp 9 allows tightening the clamp 9 without injuring the wire 30. Slot 11 facilitates the installation. An internal conductive layer 15 covers the interior of the shell and retroreflective layer 7 covers the exterior of the shell.

In FIG. 5 we show an end view of compression clamp 9. The ends of the upper base plate 37 are integrally formed in the upper half of the shell of the unit. Dual gaskets 36 may be 34 may have a slot in one end to fit around a head of one of the bolts 38 to facilitate installation.

In FIG. 6 we show an eccentric type clamp with baseplate 20 and lever arm 25 that is specifically designed for installation wherein the person doing the installation is held well above the line that will carry the marker. Baseplate 20 may be integrally formed in the upper half of the marker unit. Lever arm 25 is fastened to the baseplate 20 with pivot pin 23 and, as shown in more detail in FIG. 7, is spring loaded. Pull line 31 shown in opening 27 in lever arm 25 is used to pull lever arm 25 into the position as shown in dotted lines. The pull line 31 may then be slipped out of the lever arm. In the position shown in dotted lines the marker unit is firmly clamped to line 30. Stop pin 21 stops the lever arm 25 in the closed or clamping position as shown.

In FIG. 7 we've shown a spring 29 that may be slipped into an internal cylindrical opening formed into lever arm 25 to allow spring loading against pivot pin 23. From inspection one can see that shape of the lever arm 25, location of pivot opening in lever arm 25, location of pivot pin 23 relative to the top of slot 11, and strength of spring 29 must be taken into account to have sufficient pressure on line 30 to hold the marker unit in place. The spring 29 may be sized to prevent excess pressure against line 30 as lever arm 25 is pulled into place.

What is claimed is:

1. An enhanced daytime and nighttime visibility marker for electrical lines comprising:
   a) a plastic body means, said plastic body means being fabricated in a first upper half and a second lower half and forming a cylindrical shape with cone shaped ends when said first half is fastened to said second half;
   b) a color chosen from U.S. FEDERAL STANDARD #12197 Orange, #17875 White, AND #13538 Yellow and integrally formed in a gel coat on an exterior of said plastic body means;
   c) a transparent retroreflective tape means adhesively connected and smoothly covering said cylindrical section and said cone shaped ends of said plastic body means; said tape means acting to increase both daytime and nighttime visibility by reflection of a wide range of wave lengths of incident light;
   d) a channel means in said second half to allow placing said plastic body means over said electrical line;
   e) a clamp means in each end of said plastic body means, said clamp means being activatable to fasten said body means to said electrical line.

2. An enhanced daytime and nighttime visibility marker for electrical lines as in claim 1 further comprising
   a) an electrically conductive interior coating in said body means;
   b) a neon gas filled tube fastened in a reflective channel; said channel being mounted in an upper part of said first upper half of said plastic body means;
   c) a prismatic tape means fastened to a clear plastic top covering for said channel;
   d) a first electrode in a beginning end of said neon tube and a second electrode in an exit end of said neon tube;
   e) a first electrical connection connecting said electrical line to said first electrode and a second electrical connection connecting said conductive interior to said second electrode.

3. An enhanced daytime and nighttime visibility marker for electrical lines comprising:
   a) a plastic body means, said plastic body means being fabricated in a first upper half and a second lower half and forming a cylindrical shape with cone shaped ends when said first upper half is fastened to said second lower half;
   b) a color integrally formed in a gel coat on an exterior of said plastic body means;
   c) a fluorescent retroreflective tape means adhesively connected and smoothly covering said cylindrical shape and said cone shaped ends of said plastic body means; said tape means acting to increase both daytime and nighttime visibility by reflection of a wide range of wave lengths of incident light;
   d) a channel means in said second lower half to allow placing said plastic body means over said electrical line;
   e) a clamp means in each cone shaped end of said plastic body means, said clamp means being remotely activatable to fasten said plastic body means to said electrical line;
   f) an electrically conductive interior coating in said body means;
   g) a neon gas filled tube fastened in a reflective channel; said channel being mounted in an upper part of said first upper half of said plastic body means;
   h) a prismatic tape means fastened to a clear plastic top covering for said channel;
   i) a first electrode in a beginning end of said neon tube and a second electrode in an exit end of said neon tube;
   j) a first electrical connection connecting said electrical line to said first electrode and a second electrical connection connecting said conductive interior to said second electrode.

4. An enhanced daytime and nighttime visibility marker for electrical lines comprising:
   a) a plastic body means, said plastic body means being fabricated in a first upper half and a second lower half and forming a cylindrical shape with cone shaped ends when said first upper half is fastened to said second lower half;
   b) a color integrally formed in a gel coat on an exterior of said plastic body means;
   c) a fluorescent retroreflective tape means adhesively connected and smoothly covering said cylindrical section and said cone shaped ends of said plastic body means; said tape means acting to increase both daytime and nighttime visibility by reflection of a wide range of wave lengths of incident light;
   d) a channel means in said second lower half to allow placing said plastic body means over said electrical line;
   e) a clamp means in each end of said plastic body means, said clamp means being remotely activatable to fasten said body means to said electrical line; said remotely activatable clamp means comprising:
      1) a baseplate rigidly held in said upper half of said plastic body means;
      2) a lever arm with a near semicircular body pivotally attached to said baseplate;

3) a pivot pin in said baseplate for said pivotal attachment to said baseplate;

3) a pull rope and an opening in said lever arm to allow slipping said pull rope through said opening;

4) an opening in said body of said lever arm to allow said pivotal attachment to said baseplate; location of said opening, location of said pivot pin and shape of said body of said lever arm being such that when said plastic body means of said visibility marker is placed over a wire and said lever arm is pulled upward past a point of maximum resistance that said visibility marker is held firmly in place on said wire;

f) an electrically conductive interior coating in said body means;

g) a neon gas filled tube fastened in a reflective channel; said channel being mounted in an upper part of said first half of said body means;

h) a prismatic tape means fastened to a clear plastic top covering for said channel;

i) a first electrode in a beginning end of said neon tube and a second electrode in an exit end of said neon tube;

j) a first electrical connection connecting said electrical line to said first electrode and a second electrical connection connecting said conductive interior to said second electrode.

5. An enhanced daytime and nighttime visibility marker as in claim 4 wherein said body of said lever arm is spring loaded to limit the pressure against said wire at a point of maximum resistance when said lever arm is pulled upward to fasten said visibility marker to said wire.

* * * * *